(12) United States Patent
Hoffman (10) Patent No.: US 12,105,341 B2
(45) Date of Patent: *Oct. 1, 2024

(54) HANDHELD TOOL FOR REMOVING A WIRE FROM WITHIN AN OPTICAL CABLE

(71) Applicant: CenturyLink Intellectual Property LLC, Broomfield, CO (US)

(72) Inventor: Nathan Hoffman, LaCrosse, WI (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,010

(22) Filed: Oct. 11, 2023

(65) Prior Publication Data

US 2024/0036285 A1  Feb. 1, 2024

Related U.S. Application Data

(63) Continuation of application No. 17/656,543, filed on Mar. 25, 2022, now Pat. No. 11,789,229.

(60) Provisional application No. 63/264,654, filed on Nov. 29, 2021.

(51) Int. Cl.
*G02B 6/46* (2006.01)
*G02B 6/245* (2006.01)
*G02B 6/25* (2006.01)
*G02B 6/38* (2006.01)

(52) U.S. Cl.
CPC ............. *G02B 6/566* (2023.05); *G02B 6/245* (2013.01); *G02B 6/25* (2013.01); *G02B 6/3898* (2013.01); *G02B 6/46* (2013.01)

(58) Field of Classification Search
CPC .......... G02B 6/245; G02B 6/566; G02B 6/25; G02B 6/46; G02B 6/3898
See application file for complete search history.

(56) References Cited

U.S. PATENT DOCUMENTS

| | | | |
|---|---|---|---|
| 2,627,768 A | 2/1953 | Cook, Jr. | |
| 2,943,391 A | 7/1960 | Shannon | |
| 3,750,281 A | 8/1973 | Belling | |
| 4,805,301 A | 2/1989 | Chapin | |
| 4,972,581 A | 11/1990 | McCollum | |
| 5,140,751 A | 8/1992 | Faust | |
| 5,577,150 A | 11/1996 | Holder | |
| 6,023,844 A | 2/2000 | Hinson | |
| 8,353,107 B2 | 1/2013 | Daggett | |
| 10,498,118 B2 | 12/2019 | Lu | |
| 11,789,229 B2 * | 10/2023 | Hoffman | G02B 6/25 385/134 |
| 2010/0000372 A1 * | 1/2010 | Daggett | H02G 1/1229 81/9.4 |
| 2011/0010944 A1 | 1/2011 | Le Dissez | |
| 2015/0378126 A1 | 12/2015 | Migenes | |
| 2023/0168445 A1 | 6/2023 | Hoffman | |

\* cited by examiner

*Primary Examiner* — Michelle R Connelly (57) ABSTRACT

Handheld tools are provided for removing a wire from within an optical cable. For example, the handheld tool may be used to remove a copper wire from a fiber optic drop cable in an efficient manner without damaging other components of the fiber optic drop cable. Advantageously, the optical cable may be used immediately after the wire is removed without further steps by the technician, such as re-applying an outer protective sleeve, as is commonly required with known tools.

8 Claims, 7 Drawing Sheets

HANDHELD TOOL FOR REMOVING A WIRE FROM WITHIN AN OPTICAL CABLE

FIELD OF USE

Handheld tools are provided herein for manipulating cables used in computer networking equipment, for example, for removing a wire from within an optical cable.

BACKGROUND

Optical cables, also known as fiber-optic cables, are used to transfer data in computer networking environments, such as long distance telecommunication networks, via light signals. Optical cables typically contain a plurality of individual fibers and/or wires wrapped in a common sleeve.

For technicians working with optical cables, there are circumstances that require the removal of one or more wires from within the optical cable. For example, a fiber optic drop cable includes a copper wire that is attached along a side of the optical cable that may have to be removed by the technician during installation of the optical cable(s). Various manual techniques are presently used to remove a wire from within an optical cable. However, due to the nature of such manual techniques, wires may be damaged and/or separated during the removal process, and the remaining optical cable may retain a jagged edge. Other known tools also are not be suitable for removing a wire from within an optical cable because they are designed for completely removing the outer sleeve of the optical cable to expose all the fibers/wires therein. For example, U.S. Pat. No. 9,819,161 to Scirbona describes a cable splitter with two vertically aligned blades to cut opposing sides of the outer sleeve of the cable. Such splitters are not suitable for removing a wire from an optical cable because they split the optical cable, making it no longer suitable for use without further modifications, such as the need to re-add weather protection to the optical cable.

Accordingly, it would be desirable to provide systems, devices, and methods that improve upon known techniques for removing a wire from within an optical cable, and which enable a user to conveniently do so without causing damage to the optical cable or the wire.

SUMMARY

Provided herein are systems and methods for a handheld tool for removing a wire from within an optical cable. For example, the handheld tool may be used to remove a copper wire from a fiber optic drop cable in an efficient manner without damaging other components of the fiber optic drop cable. Advantageously, the optical cable may be used immediately after the wire is removed without further steps by the technician, such as re-applying an outer protective sleeve, as is commonly required with known tools.

In accordance with one aspect of the invention, a handheld tool is provided for removing a wire from within an optical cable. The handheld tool may include a base having a first channel extending along a longitudinal axis of the base and a blade configured to be attached to the base at a predetermined angle, such that a cutting edge of the blade is disposed in the first channel and substantially orthogonal to the longitudinal axis. The base may be sized and shaped to be held by a user. The handheld tool may further include a cable support extension extending from the base along the longitudinal axis, the cable support extension configured to define a gap between an underside of the blade and an upper surface of the cable support extension. The cable support extension may be further configured to guide the optical cable towards the blade to facilitate removal of the wire via the blade as the user advances the optical cable along the longitudinal axis.

The base may further include a first grip extension and a second grip extension. The first grip extension may extend substantially orthogonal to the longitudinal axis in a first direction away from the first channel, and the second grip extension may extend substantially orthogonal to the longitudinal axis in a second direction, opposite the first direction, away from the first channel. The first grip extension and the second grip extension are each sized and shaped such that the user grips with a finger to hold the base in one hand.

The cable support extension may include a second channel extending along the longitudinal axis of the base on the upper surface of the cable support extension. In some embodiments, the blade may then be positioned to remove the wire when the optical cable is disposed within the second channel. In other embodiments, the second channel may be configured to receive a portion of the optical cable comprising the wire, and the second channel may be configured to guide the optical cable toward the blade to facilitate removal of the wire.

The blade may be removable from the base, for example, to insert a replacement blade in the tool after the original blade becomes dull. In some embodiments, the base may include an actuator configured to unlock the blade from the base when actuated by the user so as to permit removal of the blade. The actuator may further include a spring within the base that is based to contact and lock the blade within the base. The actuator may additionally include a button that is configured to move the spring to unlock the blade from the base when the button is depressed.

The gap may be configured to receive the wire after the wire is removed from the optical cable and to guide the removed wire away from the base and the blade.

In accordance with another aspect of the invention, a method is provided for removing a wire in an optical cable. The method may include disposing the optical cable on a cable support extension extending from a base of a handheld tool, advancing the optical cable along a longitudinal axis of the base into a first channel comprising a blade having a cutting edge substantially orthogonal to the longitudinal axis, and cutting the wire from the optical cable via the blade as the optical cable is advanced along the longitudinal axis to remove the wire.

The handheld tool may include the base having the first channel extending along a longitudinal axis of the base, the blade configured to be attached to the base at a predetermined angle, and the cable support extension configured to define a gap between an underside of the blade and an upper surface of the cable support extension. The base may be sized and shaped to be held by a user.

The method may further include gripping each of a first grip extension and a second grip extension with a finger to hold the base in one hand. The first grip extension may extend substantially orthogonal to the longitudinal axis in a first direction away from the first channel, and the second grip extension may extend substantially orthogonal to the longitudinal axis in a second direction, opposite the first direction, away from the first channel.

The optical cable may be disposed in a second channel extending along the longitudinal axis of the base on the upper surface of the cable support extension. Cutting the wire may therefore include advancing the optical cable along the second channel to facilitate removing the wire, and guiding the optical cable toward the blade via the second channel to facilitate removal of the wire.

The method may further include removing the blade from the handheld tool and replacing the blade with a new blade.

In accordance with another aspect of the invention, an apparatus may be provided. The apparatus may include a base having a first channel extending along a longitudinal axis of the base, a first grip extension extending substantially orthogonal to the longitudinal axis in a first direction away from the first channel, and a second grip extension extending substantially orthogonal to the longitudinal axis in a second direction, opposite the first direction, away from the first channel. The base may be sized and shaped to be held by a user. The first grip extension and the second grip extension may each be sized and shaped such that the user may grip with a finger to hold the base in one hand. The apparatus may further include a blade configured to be attached to the base at a predetermined angle such that a cutting edge of a blade is disposed in the first channel and substantially orthogonal to the longitudinal axis, and a cable support extension extending from the base along the longitudinal axis. The cable support extension may be configured to define a gap between an underside of the blade and an upper surface of the cable support and to guide an optical cable toward the blade to facilitate removal of a wire in the optical cable via the blade as the user advances the optical cable along the longitudinal axis.

The blade may be positioned to remove the wire from the optical cable when the optical cable is disposed on the cable support extension. The gap may be configured to receive the wire after the wire is removed from the optical cable and to guide the removed wire away from the base and the blade.

The cable support extension may include a second channel extending along the longitudinal axis of the base on the upper surface of the cable support extension. The blade may be configured to remove a wire from the optical cable when the optical cable is disposed within the second channel.

DETAILED DESCRIPTION

Systems and methods are provided for using a handheld tool to remove a wire from within an optical cable. Systems configured in accordance with the principles of the present disclosure include a base, a blade, and a cable support extension. When an optical cable is advanced along the cable support extension towards the blade, the blade is configured to remove the wire from within the optical cable.

Handheld tools described herein are particularly advantageous for use in the field of optical cables. The handheld tool thus enables a user to conveniently remove a wire from within an optical cable. For example, the handheld tool may be used to remove a copper wire from a fiber optic drop cable. Although the devices and methods of the invention are described herein with respect to an application in which a wire can be removed from an optical cable, and more generally in an optical cable, they are not limited to such an application. Instead, the principles of the present invention may be applied to a cable where it is desirable to remove a wire from the cable with minimal impact on other portions of the cable.

Figure 1:
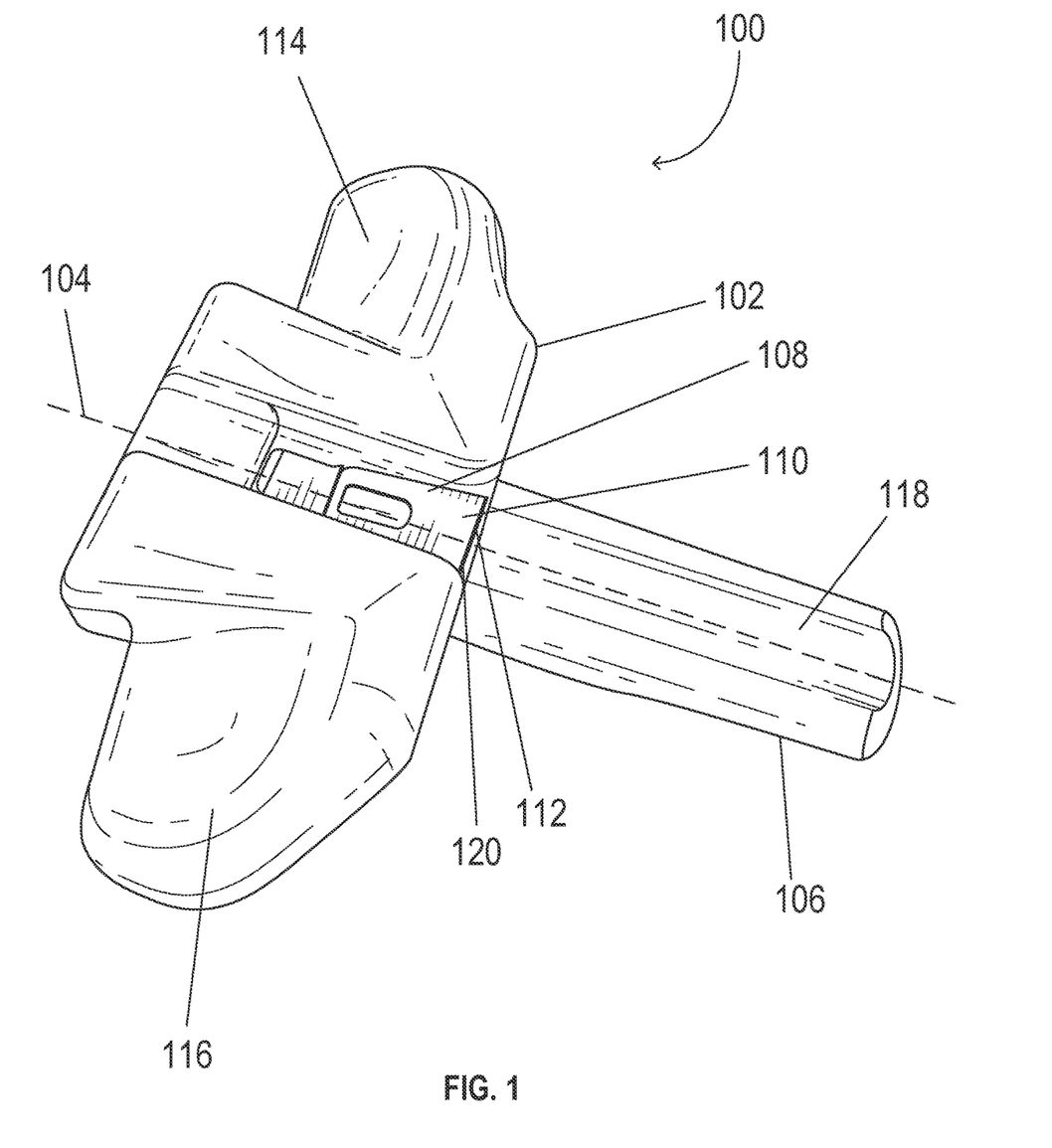
FIG. 1 illustrates an exemplary handheld tool for removing a wire from within an optical cable constructed in accordance with the principles of the present disclosure.

Referring now to FIG. 1, an exemplary handheld tool for removing a wire from within an optical cable configured in accordance with one aspect of the present disclosure is described. As shown in FIG. 1, handheld tool 100 may include base 102 that extends along longitudinal axis 104. Tool 100 may further include cable support extension 106 that also extends along longitudinal axis 104. Cable support extension 106 is designed to support an optical cable while a user is cutting a wire from the optical cable during use of tool 100. Base 102 and cable support extension 106 may be made of a rigid material such as plastic, and the components may be separately or integrally formed. Base 102 is preferably sized and shaped to be held by a user. As such, tool 100 is usable by a technician in the field working with optical cables in an easy-to-hold design. Base 102 may have first channel 108 extending along longitudinal axis 104. Preferably, first channel 108 is sized and shaped to receive blade 110 in first channel 108.

Tool 100 is designed to hold blade 110 defining cutting edge 112 to cut a wire from the optical cable during use of tool 100. Blade 110 may be a commercially available razor blade. Blade 110 may be fixedly integrated into tool 100 or may be removable such that blade 110 is replaceable (e.g., as cutting edge 112 becomes dull from use). Blade 110 may be configured to fit into first channel 108. In use, blade 110 is attached to base 102 at a predetermined angle such that cutting edge 112 of blade 110 is substantially orthogonal to longitudinal axis 104.

Tool 100 may further include first grip extension 114 and second grip extension 116. First grip extension 114 may extend substantially orthogonal to longitudinal axis 104 of base 102 in a first direction away from first channel 108. Second grip extension 116 may extend substantially orthogonal to longitudinal axis 104 of base 102 in a second direction away from first channel 108, where the first direction and the second direction are opposite each other. First grip extension 114 and second grip extension 116 may be sized and shaped for a user to grip base 102 with a finger to hold base 102 in the user's hand. As such, first and second grip extensions 114 and 116 assist the user with securely holding tool 100 as the wire is cut from the optical cable. In alternative embodiments, base 102 may not include first grip extension 114 and second grip extension 116, and base 102 may be otherwise sized and shaped for a user to grip base 102 with the user's hand.

Referring still to FIG. 1, cable support extension 106 may have second channel 118 extending along longitudinal axis 104 of base 102 on an upper surface of cable support extension 106. Second channel 118 is sized and shaped to receive an optical cable to assist the user with guiding the optical cable towards cutting edge 112 of blade 110 and, after cutting begins, for guiding the optical cable along longitudinal axis 104 during cutting. Second channel 118 may guide the optical cable towards blade 110 to facilitate removal of a wire from within the optical cable. Blade 110 may be positioned such that it removes the wire from within the optical cable when the optical cable is disposed within second channel 118 and advanced towards blade 110. In alternative embodiments, the cable support extension may not include second channel 118.

Figure 2:
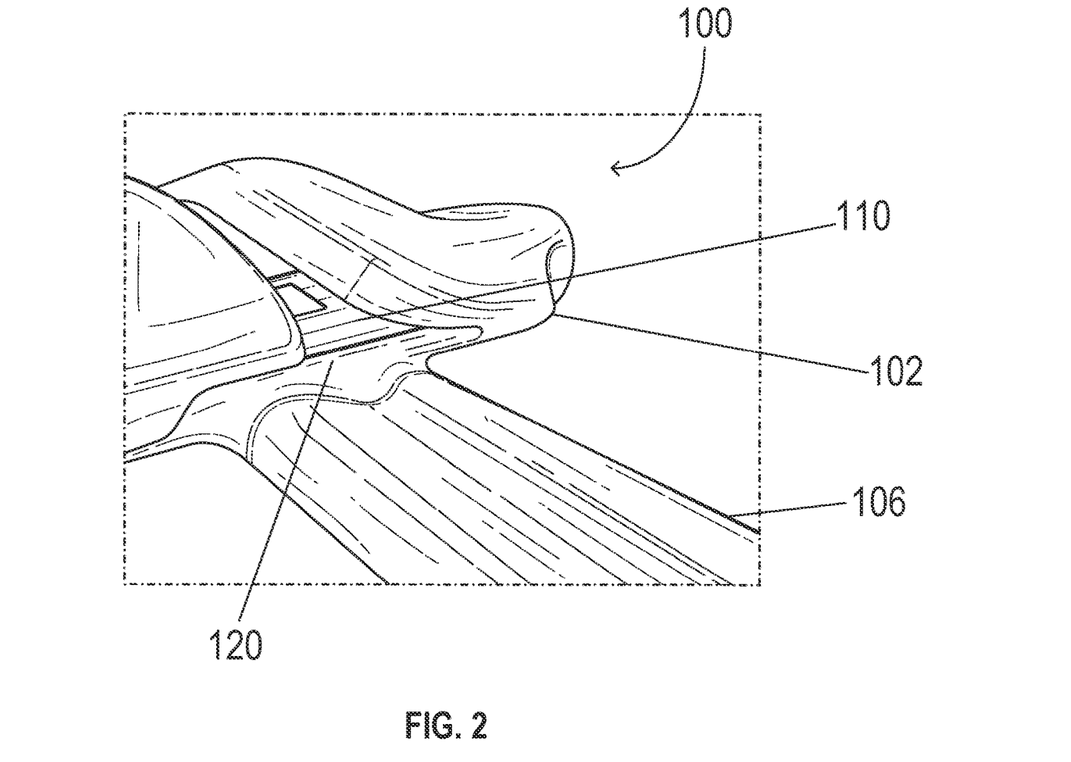
FIG. 2 illustrates a perspective view of the handheld tool of FIG. 1.

FIG. 2 illustrates a perspective view of tool 100 showing the positioning of blade 110 in tool 100 in more detail, in accordance with some aspects. Cable support extension 106 may extend from base 102 along the longitudinal axis, such that cable support extension 106 defines gap 120 between an underside of blade 110 and an upper surface of cable support extension 106. Blade 110 may therefore be disposed at a predetermined height within first channel 108 to ensure that gap 120 exists. By providing gap 120 between blade 110 and cable support extension 106, the wire cut from the optical cable can travel into gap 120 and be deflected by the inner wall of cavity-defining gap 120 such that the cut wire does not interfere with continued cutting of the optical cable.

Figure 3:
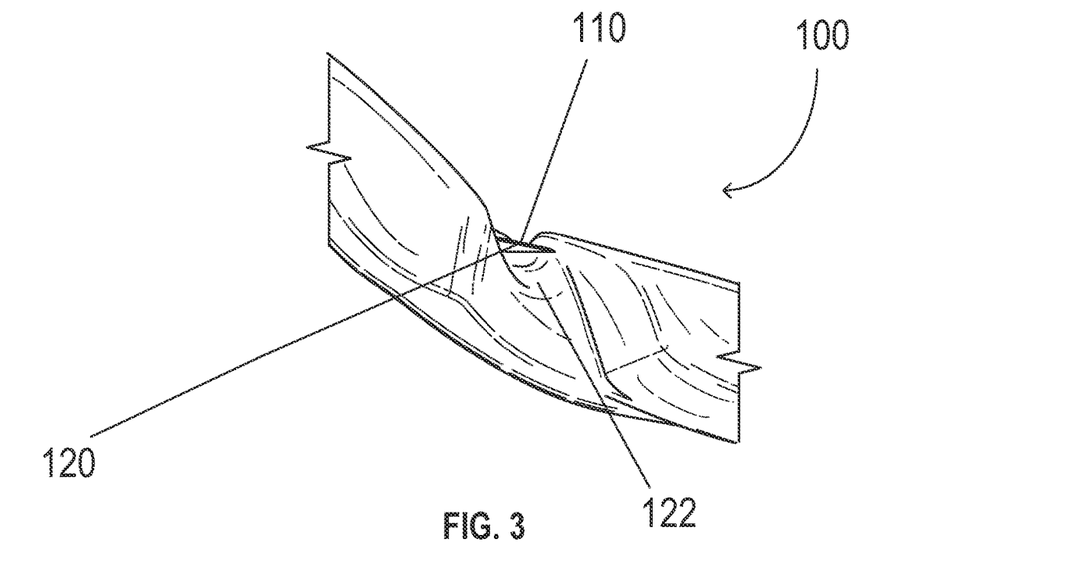
FIG. 3 illustrates a perspective view of a portion of the handheld tool of FIG. 1

Referring now to FIG. 3, another perspective view of tool 100 shows further detail on gap 120. As shown, gap 120 may be connected to wire channel 122 that defines a groove in channel to guide the wire cut from the optical cable away from blade 110. The wire may spiral as it is removed from the optical cable and wire channel 122 is angled away from blade 110 towards an end surface of tool 100.

Figure 4:
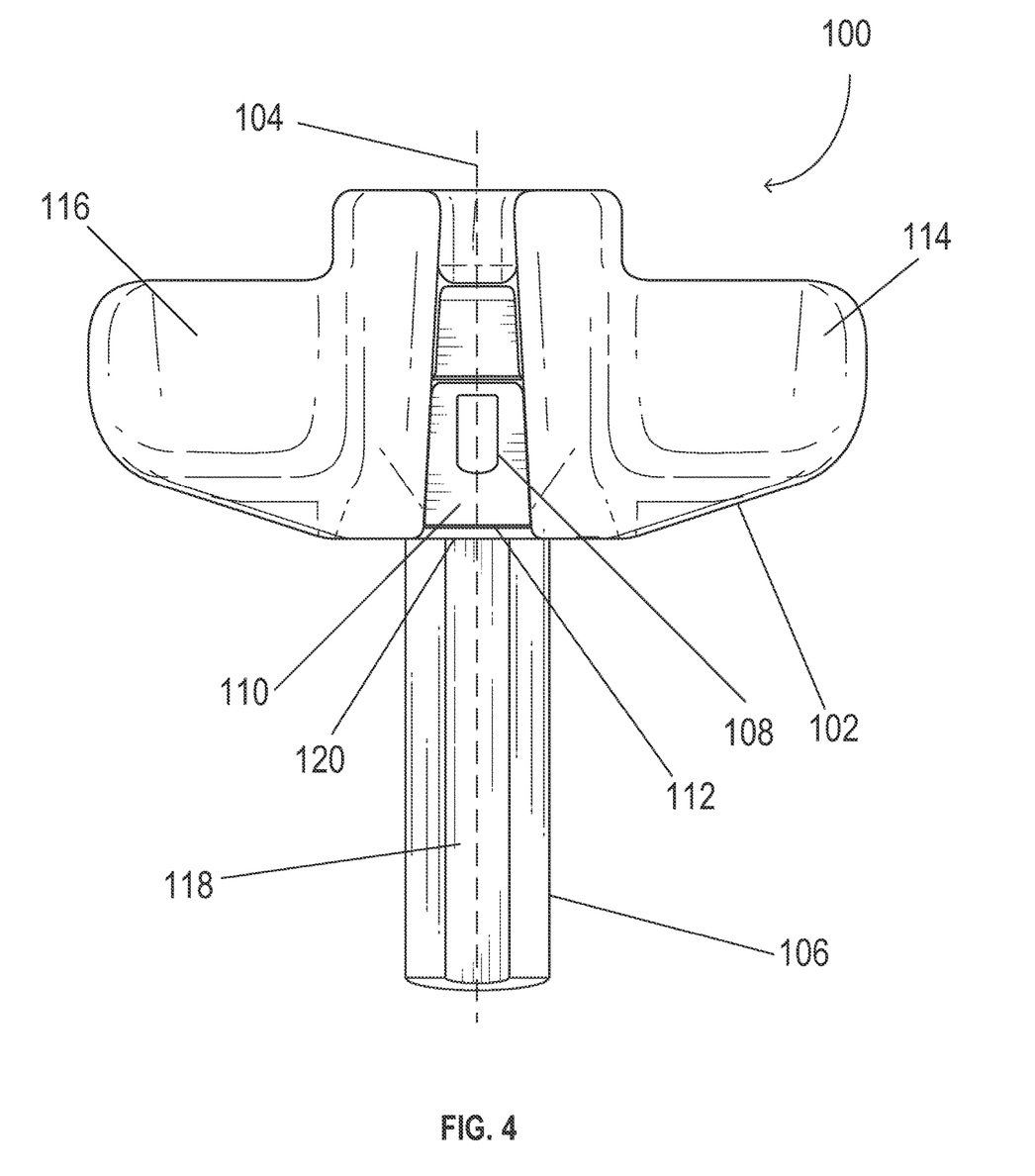
FIG. 4 illustrates a top view of the handheld tool of FIG. 1.

Referring now to FIG. 4, a top view of the handheld tool 100 of FIG. 1 is described. As depicted in FIG. 4, gap 120 may be disposed proximate to blade 110. In alternative embodiments, gap 120 may be disposed under blade 110.

Figure 5:
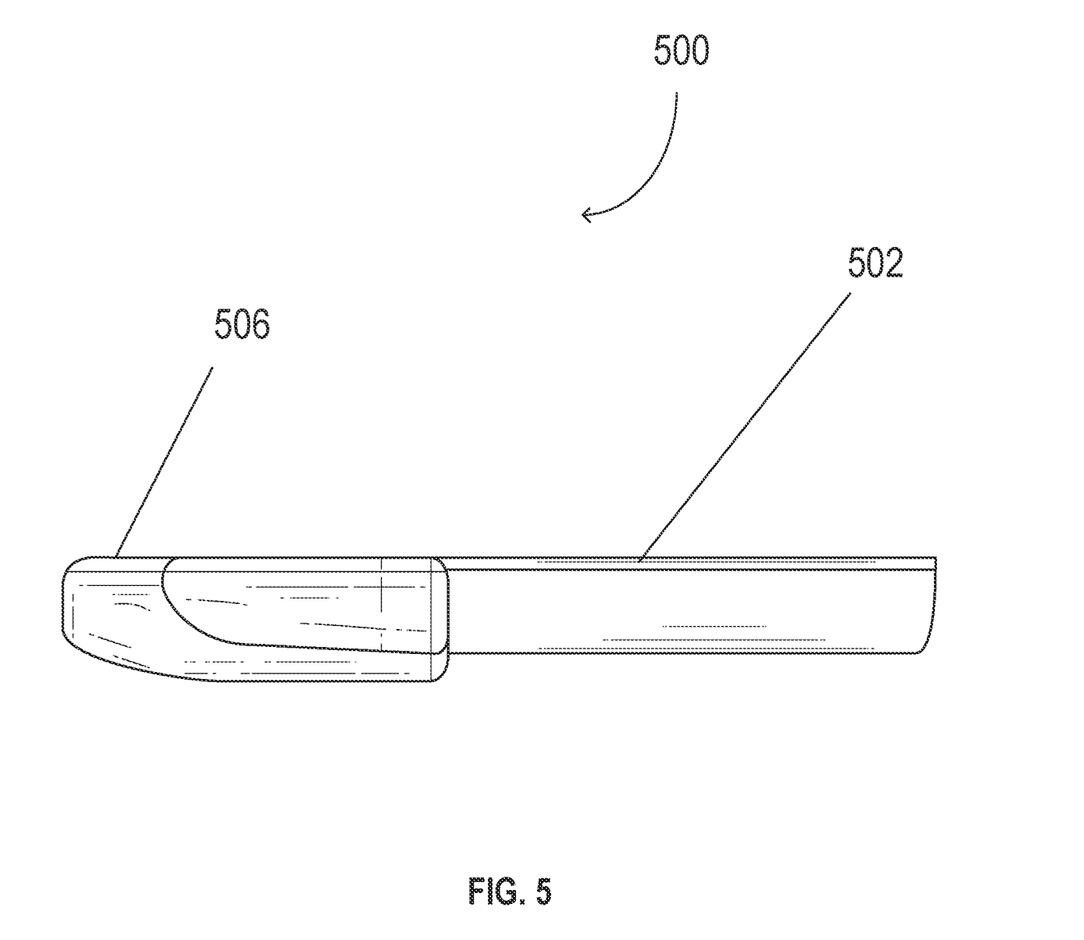
FIG. 5 illustrates a side view of the handheld tool of FIG. 1.

Referring now to FIG. 5, a side view 500 of handheld tool 100 is described. As depicted in FIG. 5, cable support extension 506 may be thicker than base 502. In alternative embodiments, cable support extension 506 may be thinner than base 502.

Figure 6A:
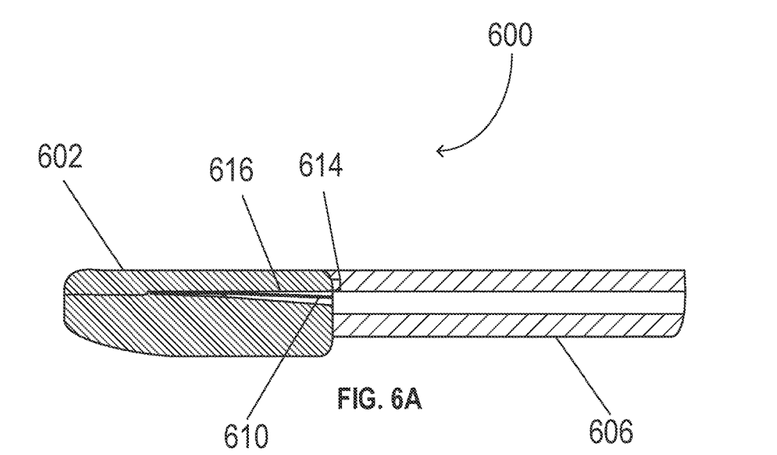
FIG. 6A illustrates a cross-sectional view of an alternative exemplary handheld tool for removing a wire from within an optical cable constructed in accordance with the principles of the present disclosure.
Figure 6B:
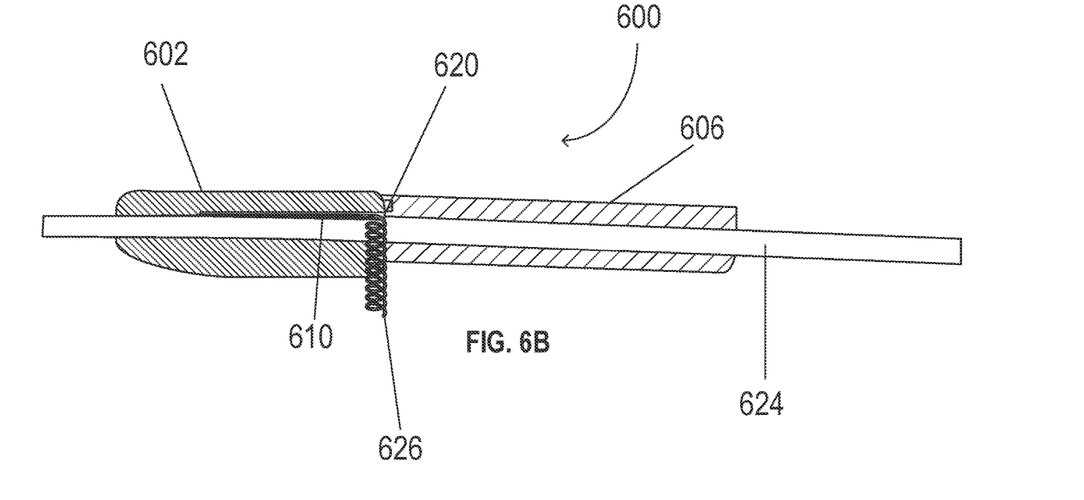
FIG. 6B illustrates a cross-sectional view of the handheld tool of FIG. 6A when the handheld tool is applied to an optical cable.

Referring now to FIGS. 6A and 6B, a cross-sectional view of handheld tool 600 is described. In some alternative embodiments, handheld tool 600 may be configured such that blade 610 is removable from base 602. Base 602 may include actuator 614 and spring 616, such that when the user actuates actuator 614 (e.g., by depressing a button), spring 616 may be activated to release blade 610 from base 602. Actuator 614 may therefore be configured for connection to spring 616 such that actuation of the actuator 614 causes blade 610 to be unlocked from base 602 to enable removal of blade 610. Such a mechanism may allow the user to change blade 610 as needed. Actuator 614 may be disposed on a side of base 602 proximate to cable support extension 606.

Referring specifically to FIG. 6B, blade 610 may be disposed at a predetermined height in order to create gap 620 between blade 610 and a surface of cable support extension 606. As depicted in FIG. 6B, gap 620 may consist of a space between an underside of blade 610 and cable support extension 606. In alternative embodiments, such as handheld tool 100 of FIG. 1, gap 620 may extend through base 602. When optical cable 624 is advanced along cable support extension 406 towards blade 610, removed wire 626 may exit handheld tool 600 by passing through gap 620. Removed wire 626 may pass directly through base 602 away from optical cable 624 if gap 620 extends through base 602.

Removed wire 626 may alternatively exit through gap 620 towards a top side of base 602.

Figure 7A:
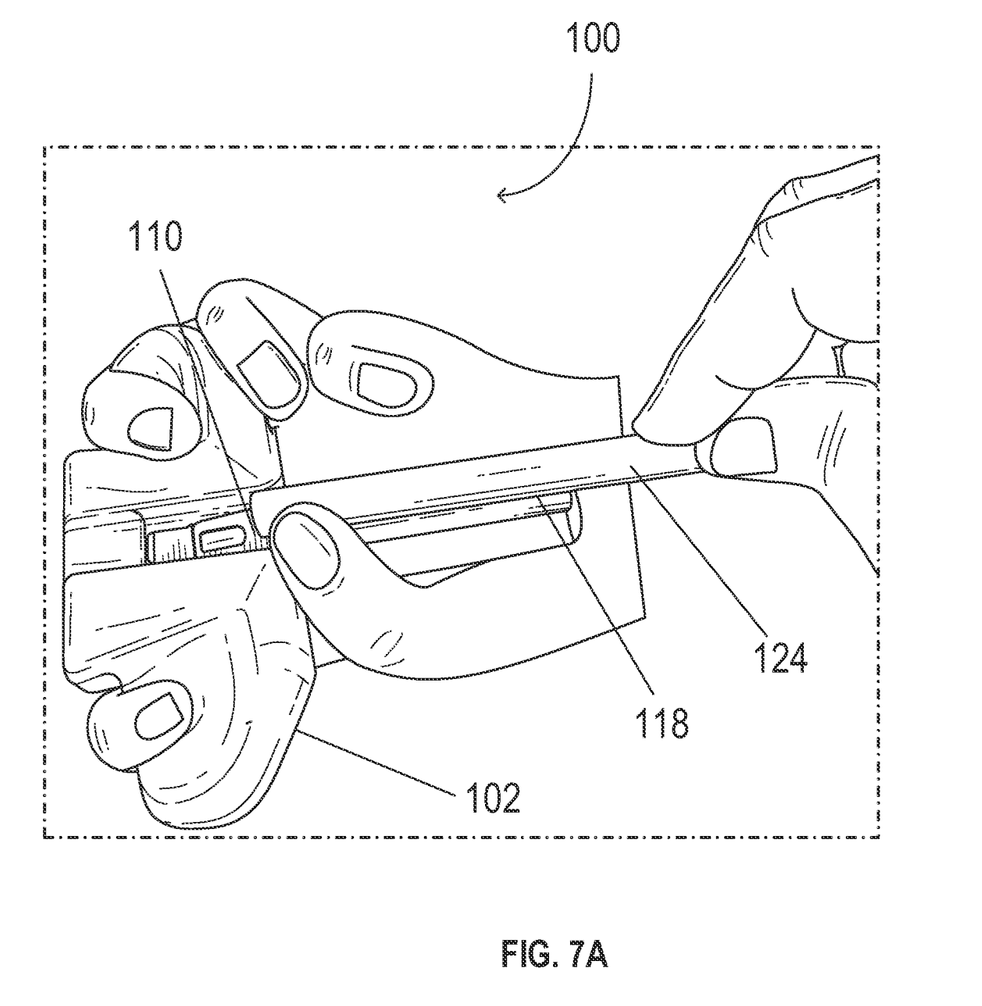
FIGS. 7A-B illustrates an exemplary process of removing a wire from within an optical cable using the handheld tool of FIG. 6A in accordance with the principles of the present disclosure.
Figure 7B:
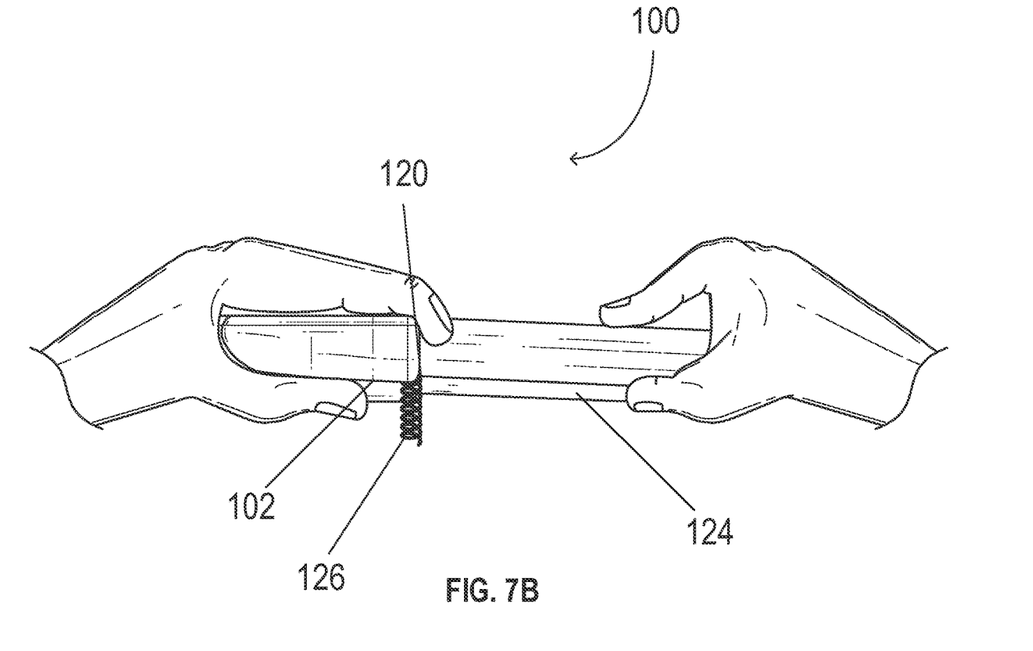

Referring to FIGS. 7A and 7B, a method of using a handheld tool, such as handheld tool 100 depicted in FIG. 1, to remove a wire from an optical cable is described. As depicted in FIG. 7A, optical cable 124 may be disposed within second channel 118 by a user with one hand. The user may use his or her other hand to grip base 102. A user may then advance optical cable 124 along second channel 118 towards blade 110. Once the user begins cutting the wire from the optical cable, tool 100 may sometimes be flipped over to continue the cutting process, as shown in FIG. 7B.

As depicted in FIG. 7B, as optical cable 124 comes into contact with blade 110, blade 110 cuts and separates wire 126 from within optical cable 118. Removed wire 126 may exit through gap 120 in a direction away from handheld tool 100. Although not depicted in FIG. 7B, in alternative embodiments, if gap 120 extends through base 102, removed wire 120 may exit through gap 120 in an opposite direction through base 102 and away from handheld tool 100.

While various illustrative embodiments of the invention are described above, it will be apparent to one skilled in the art that various changes and modifications may be made therein without departing from the invention. The appended claims are intended to cover all such changes and modifications that fall within the true scope of the invention.

What is claimed:

1. A handheld tool for removing a wire from within an optical cable, the handheld tool comprising:
    a base having a first channel extending along a longitudinal axis of the base, the base sized and shaped to be held by a user;
    a blade configured to be attached to the base at a predetermined angle such that a cutting edge of the blade is disposed in the first channel and substantially orthogonal to the longitudinal axis; and
    a cable support extension extending from the base along the longitudinal axis, the cable support extension configured to define a gap between an underside of the blade and an upper surface of the cable support extension,
    wherein the cable support extension is configured to guide the optical cable toward the blade to facilitate removal of the wire via the blade as the user advances the optical cable along the longitudinal axis, and
    wherein the gap extends through the base and is configured to receive the wire after the wire is removed from the optical cable and to guide the removed wire away from the base and the blade.

2. The handheld tool of claim 1, wherein the base further comprises:
    a first grip extension extending substantially orthogonal to the longitudinal axis in a first direction away from the first channel; and
    a second grip extension extending substantially orthogonal to the longitudinal axis in a second direction, opposite the first direction, away from the first channel,
    wherein the first grip extension and the second grip extension are each sized and shaped such that the user grips with a finger to hold the base in one hand.

3. The handheld tool of claim 1, wherein the cable support extension comprises a second channel extending along the longitudinal axis of the base on the upper surface of the cable support extension.

4. The handheld tool of claim 3, wherein the blade is positioned to remove the wire when the optical cable is disposed within the second channel.

5. The handheld tool of claim 3, wherein the second channel is configured to receive a portion of the optical cable comprising the wire, the second channel configured to guide the optical cable toward the blade to facilitate removal of the wire.

6. An apparatus comprising:
a base comprising:
a first channel extending along a longitudinal axis of the base, the base sized and shaped to be held by a user;
a first grip extension extending substantially orthogonal to the longitudinal axis in a first direction away from the first channel; and
a second grip extension extending substantially orthogonal to the longitudinal axis in a second direction, opposite the first direction, away from the first channel,
wherein the first grip extension and the second grip extension are each sized and shaped such that the user grips with a finger to hold the base in one hand;
a blade configured to be attached to the base at a predetermined angle such that a cutting edge of a blade is disposed in the first channel and substantially orthogonal to the longitudinal axis; and
a cable support extension extending from the base along the longitudinal axis, the cable support extension configured to define a gap between an underside of the blade and an upper surface of the cable support,
wherein the cable support extension is configured to guide an optical cable toward the blade to facilitate removal of a wire in the optical cable via the blade as the user advances the optical cable along the longitudinal axis, and
wherein the gap extends through the base and is configured to receive the wire after the wire is removed from the optical cable and to guide the removed wire away from the base and the blade.

7. The apparatus of claim 6, wherein the blade is positioned to remove the wire from the optical cable when the optical cable is disposed on the cable support extension.

8. The apparatus of claim 6, wherein the cable support extension comprises a second channel extending along the longitudinal axis of the base on the upper surface of the cable support extension, and wherein the blade is configured to remove a wire from the optical cable when the optical cable is disposed within the second channel.

* * * * *